(12) United States Patent
Shibata et al.

(10) Patent No.: US 7,282,874 B2
(45) Date of Patent: Oct. 16, 2007

(54) ALIGNMENT APPARATUS, EXPOSURE APPARATUS, AND DEVICE MANUFACTURING METHOD

(75) Inventors: Yugo Shibata, Utsunomiya (JP); Atsushi Kimura, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/342,040

(22) Filed: Jan. 27, 2006

(65) Prior Publication Data

US 2006/0175993 A1    Aug. 10, 2006

(30) Foreign Application Priority Data

Jan. 27, 2005   (JP)   ............... 2005-020019

(51) Int. Cl.
*H02P 5/00*   (2006.01)
(52) U.S. Cl. .................. 318/135; 318/38; 318/34; 318/687; 318/592; 318/593; 74/490.09; 74/490.13; 414/749; 269/71; 269/73; 108/137; 108/143
(58) Field of Classification Search ............... 318/135, 318/590, 592, 593, 597, 625, 38, 34, 687; 74/490.09, 490.13; 414/749; 269/71, 73; 108/20, 137, 143
See application file for complete search history.

(56) References Cited

U.S. PATENT DOCUMENTS

| | | | |
|---|---|---|---|
| 5,623,853 A * | 4/1997 | Novak et al. ............ | 74/490.09 |
| 5,703,420 A * | 12/1997 | Kamata et al. ............... | 310/54 |
| 6,762,516 B2 * | 7/2004 | Maruyama .................... | 310/12 |
| 6,810,298 B2 * | 10/2004 | Emoto ......................... | 700/121 |
| 6,873,404 B2 * | 3/2005 | Korenaga ..................... | 355/72 |
| 6,885,430 B2 * | 4/2005 | Tanaka et al. ................ | 355/53 |
| 6,958,808 B2 * | 10/2005 | Tanaka et al. ................ | 355/72 |
| 6,992,755 B2 * | 1/2006 | Kubo .......................... | 355/72 |
| 7,064,804 B2 * | 6/2006 | Emoto ......................... | 355/30 |
| 7,106,414 B2 * | 9/2006 | Tsuji et al. ................... | 355/30 |
| 7,116,396 B2 * | 10/2006 | Tsuji et al. ................... | 355/30 |
| 2001/0055102 A1 * | 12/2001 | Emoto ......................... | 355/53 |
| 2003/0007140 A1 | 1/2003 | Korenaga ..................... | 355/72 |
| 2003/0098962 A1 | 5/2003 | Kubo .......................... | 355/72 |
| 2005/0088634 A1 * | 4/2005 | Kosugi et al. ................ | 355/30 |
| 2005/0140959 A1 * | 6/2005 | Tsuji et al. ................... | 355/72 |

FOREIGN PATENT DOCUMENTS

| | | |
|---|---|---|
| JP | 2003-022960 | 1/2003 |
| JP | 2003-163257 | 6/2003 |
| JP | 2004-254489 | 9/2004 |

\* cited by examiner

*Primary Examiner*—Rita Leykin
(74) *Attorney, Agent, or Firm*—Cowan, Liebowitz & Latman, P.C.

(57) ABSTRACT

An alignment apparatus which moves a object comprises a first structure having a holding member which holds the object, a second structure having a magnet which constitutes a linear motor, the linear motor drives the first and second structure, and a flow passage formed between the holding member and the magnet.

11 Claims, 16 Drawing Sheets

F I G. 5
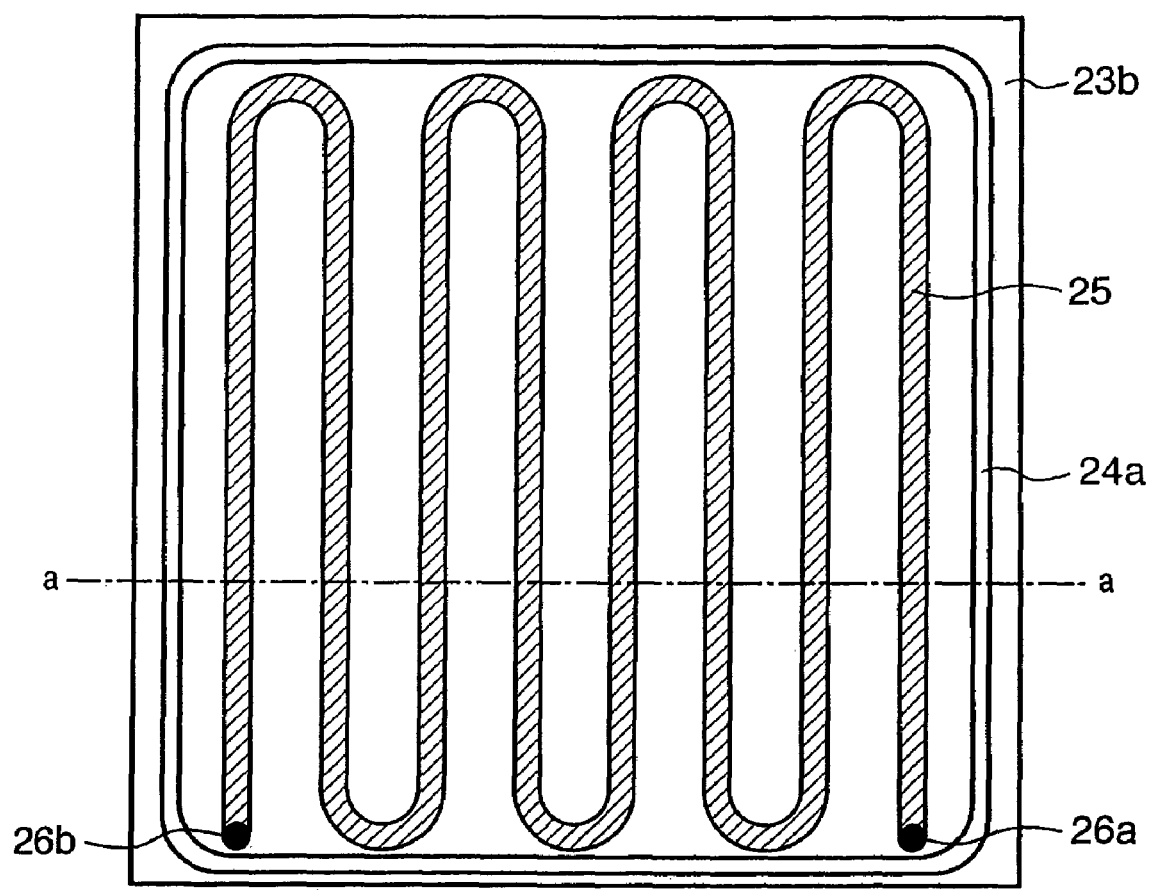

PORTION B

ALIGNMENT APPARATUS, EXPOSURE APPARATUS, AND DEVICE MANUFACTURING METHOD

FIELD OF THE INVENTION

The present invention relates to an alignment apparatus such as a stage which is mounted in a semiconductor exposure apparatus used in the manufacture of a semiconductor element, liquid crystal display element, and the like, and in various types of precision machining apparatuses and various types of precision measurement apparatuses, to move a substrate such as a semiconductor wafer, mask, or reticle accurately at a high speed so as to align it. The present invention is also suitable to a method of manufacturing a semiconductor device and the like by using an exposure apparatus that uses the alignment apparatus.

BACKGROUND OF THE INVENTION

FIG. 14 is a perspective view showing a wafer stage mounted in a semiconductor exposure apparatus (see Japanese Patent Laid-Open No. 2003-022960).

A wafer stage 300 has a function of holding a wafer (not shown) with a wafer chuck 301a and transporting the wafer to an alignment position or exposure position to align it there. An X-direction coarse-movement beam 303 is arranged on a stage base 310 to be movably guided on the flat surface of the base 310 through a hydrostatic bearing (not shown). The posture of the X-direction coarse-movement beam 303 is held by an X-direction yaw guide 308 in a yaw direction through a hydrostatic bearing (not shown). Accordingly, the X-direction coarse-movement beam 303 is guided to be movable in only an X direction. Similarly, a Y-direction coarse-movement beam 304 is guided by the stage base 310 and a Y-direction yaw guide 309 to be movable in only a Y direction.

Coarse-movement linear motor movable elements 307 using permanent magnets are arranged on the two ends of each of the X- and Y-direction coarse-movement beams 303 and 304. A pair of X-direction coarse-movement linear motor stators 305a and 305b and a pair of Y-direction coarse-movement linear motor stators 306a and 306b are arranged to sandwich the coarse-movement linear motor movable elements 307 in the vertical direction. Each of the coarse-movement linear motor stators 305a, 305b, 306a, and 306b is obtained by winding a coil around an iron core formed by stacking comb-shaped thin silicon steel plates. A magnetic attracting force acts between each iron core and the corresponding coarse-movement linear motor movable element 307. The coarse-movement linear motor movable element 307 is sandwiched by the coarse-movement linear motor stators at equal gaps in the vertical direction to cancel the attracting force.

When a current is appropriately supplied to the coils of the coarse-movement linear motor stators 305a, 305b, 306a, and 306b, thrusts can be generated between the coarse-movement linear motor stators and the coarse-movement linear motor movable elements 307. The coarse-movement linear motor stators are formed on the same structure as that of the stage base 310, and the thrusts act in the respective moving directions of the X- and Y-direction coarse-movement beams 303 and 304. Corner cubes (not shown) are provided to the X- and Y-direction coarse-movement beams 303 and 304 to reflect laser beams from laser interferometers (not shown). The positions in the respective moving directions of the X- and Y-direction coarse-movement beams 303 and 304 are measured by the laser interferometers. A control system (not shown) controls positioning of the X- and Y-direction coarse-movement beams 303 and 304 with the measurement values of the respective laser interferometers and the coarse-movement linear motors.

An X-Y slider 302 is arranged to surround the X- and Y-direction coarse-movement beams 303 and 304. The weight of the X-Y slider 302 is received by the stage base 310 with a hydrostatic bearing (not shown) provided to the bottom plate of the X-Y slider 302. Hence, the X-Y slider 302 is guided on the stage base 310 to be movable within an X-Y plane. Noncontact guides are formed between the X-Y slider 302 and the X- and Y-direction coarse-movement beams 303 and 304. The noncontact guides can comprise either static guides or electromagnetic guides.

Furthermore, a fine-movement stage 301 is mounted on the X-Y slider 302. The fine-movement stage 301 is mounted on the X-Y slider 302 by insulating vibration from below by a pneumatic spring or a self-weight compensating system which employs magnetic repulsion. Single-phase linear motor stators comprising coils are provided to the X-Y slider 302, and single-phase linear motor movable elements comprising permanent magnets are provided to the fine-movement stage 301. The single-phase linear motors can apply thrusts in the X, Y, and Z directions and in ωx, ωy, and ωz directions which are the rotational directions about the X-, Y-, and Z-axes to the fine-movement stage 301. For example, three single-phase linear motors may be arranged at positions that do not line up straightly in the Z direction to apply thrusts in the Z, ωx, and ωy directions. Two single-phase linear motors may be arranged in the X direction and two single-phase linear motors may be arranged in the Y direction to apply thrusts in the X, Y, and ωz directions.

A laser reflection mirror (not shown) is provided to the fine-movement stage 301 to reflect the laser beams from the laser interferometers (not shown), so as to measure the positional displacement in 6 degrees of freedom (X, Y, Z, ωx, ωy, and ωz) of the fine-movement stage 301. Position control systems (not shown) are provided to the X- and Y-direction coarse-movement beams 303 and 304 and fine-movement stage 301, respectively, and give appropriate commands to the X and Y linear motors and single-phase linear motors to accurately align the wafer stage at an arbitrary position within a movable range.

The imaging characteristics of the projection optical systems and the measurement accuracy of the leaser interferometer are largely adversely affected by the apparatus and a change in ambient temperature. When the ambient temperature changes, the laser beam of the laser interferometer fluctuates to degrade the measurement accuracy. When the temperature changes, the member to which a mirror as the measurement target of the laser interferometer deforms. Then, the positions relative to each other of the mirror as the positional reference and the substrate change to degrade the measurement accuracy simultaneously. Particularly, today an alignment accuracy on the order of nanometer (nm) is required. For example, a 100-mm low-expansion member (with a thermal expansion coefficient of $1 \times 10^{-6}$) deforms by 100 nm with a temperature change of 1° C. Even when a change in air temperature in the laser optical path of the laser interferometer is 1° C., the measurement value of the position may change by 100 nm depending on the conditions. Hence, it is significant to maintain the constituent members of the projection exposure apparatus and the ambient temperature constant.

The fine-movement stage described above is driven highly accurately at high speed and with high acceleration. Thus, the load acting on the actuator such as the linear motor that drives the fine-movement stage increases, and the necessary current increases accordingly to increase the heat generated by the coil. As the wafer size increases, the stage size also increases. Thus, the load acting on the actuator increases and the necessary current increases to increase the heat generated by the coil. When the ambient temperature is changed by the generated heat, the laser beam of the laser interferometer fluctuates to degrade the measurement accuracy. The member (fine-movement stage) to which the mirror as the measurement target of the laser interferometer deforms. Then, the positions relative to each other of the mirror as the positional reference and the substrate change to degrade the measurement accuracy simultaneously.

To avoid heat generation, the movable element is desirably made lightweight. In view of this, a structure is proposed as described in Japanese Patent Laid-Open No. 2003-163257 (see FIGS. 2 to 6), in which a top panel serving as a stage constituent member is bored to form a hollow structure so as to decrease the weight, and ribs are arranged in the top panel to maintain high rigidity. With the method of forming the top panel to have the hollow structure in this manner, to obtain required rigidity, the side plates which surround the top panel have large thicknesses. Consequently, the heavy top plate is not worth the improvement of rigidity.

In the trend for a larger wafer size, the alignment apparatus shown in FIG. 14 which has a 2×2 matrix structure formed of X- and Y-direction beams becomes very bulky, and the following problems arise accordingly.

It is difficult to obtain desired stage acceleration.

Heat generated by the linear motors during acceleration increases to make it difficult to ensure high exposure accuracy.

As the mechanical natural frequency of the stage decreases, it becomes difficult to ensure a servo band.

Due to the above problems, with the conventional arrangement, to realize a desired specification is becoming difficult. In order to provide a stage apparatus that copes with an increase in wafer size, a guideless flat stage having 6 degrees of freedom is proposed, which can perform alignment with a long stroke in X-Y planar directions, in addition to the tilting and Z directions (for example, see Japanese Patent Laid-Open No. 2004-254489).

SUMMARY OF THE INVENTION

The present invention has been made in view of the above problems, and has as its object to provide a technique which can suppress temperature increase of a movable element to decrease an influence such as thermal deformation of the movable element, so as to decrease the influence on a change in ambient temperature, thus enabling highly accurate alignment.

In order to solve the above problems and to achieve the above object, according to the first aspect of the present invention, there is provided an alignment apparatus comprising a first structure having a holding member which holds the object, a second structure having a magnet which constitutes a linear motor, the linear motor drives the first and second structure, and a flow passage formed between the holding member and the magnet.

In the above aspect, the second structure is configured by overlaying a first plate-like member and a second plate-like member, and the flow passage comprises a pipe formed between the first plate-like member and the second plate-like member.

In the above aspect, the pipe comprises a groove portion formed between the first plate-like member and the second plate-like member.

In the above aspect, the groove portion is formed in at least either one of the first plate-like member and the second plate-like member.

In the above aspect, the first plate-like member comprises the groove portion and the second plate-like member comprises a lid member which closes the groove portion.

In the above aspect, the first plate-like member and the second plate-like member are bonded through a seal member.

In the above aspect, the magnet is attached to the second structure through a third plate-like member, and the flow passage is formed in the third plate-like member.

In the above aspect, a recess is formed in side surface of the first structure.

In the above aspect, the linear motor is a surface motor.

The present invention is applied to an exposure apparatus comprising any one of the alignment apparatuses described above, wherein the alignment apparatus moves at least one of a master and substrate to expose a pattern on the master onto the substrate, and a device manufacturing method of manufacturing a semiconductor device using the exposure apparatus.

According to the second aspect of the present invention, there is provided a stage apparatus comprises a stage which has top plate, bottom plate and side plate, a base which supports the stage to be movable, and a driver which drives the stage relative to the base, wherein the side plate has a rib structure.

As has been described above, according to the present invention, the flow passage to circulate the refrigerant which cools the movable element is formed. Heat can be recovered from the movable element which is heated by heat generated by the coil of the stator. Thus, temperature increase of the movable element can be suppressed to decrease an influence such as thermal deformation of the movable element. Also, an influence on a change in ambient temperature can be decreased. As a result, highly accurate alignment can be performed.

The side plates which surround the top panel are bored to form recesses in directions of normal to the side plates, and rib structures are formed in the side plates. Thus, the top panel can be made lightweight while maintaining high rigidity, so that heat generated by the coil of the stator can be suppressed. More specifically, temperature increase of the movable element can be suppressed to decrease an influence such as thermal deformation of the movable element. Also, an influence on a change in ambient temperature can be decreased. As a result, highly accurate alignment can be performed.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 5 is a plan view of the top panel (second structure) of FIG. 4;

DETAILED DESCRIPTION OF THE PREFERRED EMBODIMENTS

Regarding the embodiments of the present invention, an example will be described in detail with reference to the accompanying drawings, in which a moving target member is a wafer as a photosensitive substrate and the present invention is applied to a semiconductor exposure apparatus. The present invention may also be applied to a case in which the moving target member is a reticle which is a master having a circuit pattern.

The present invention will now be described in detail. Note that the embodiments to be described hereinafter are merely examples of a means that implements the present invention, and should be appropriately modified or changed depending on the arrangement and various types of conditions of the apparatus to which the present invention is applied.

First Embodiment

Figure 1:
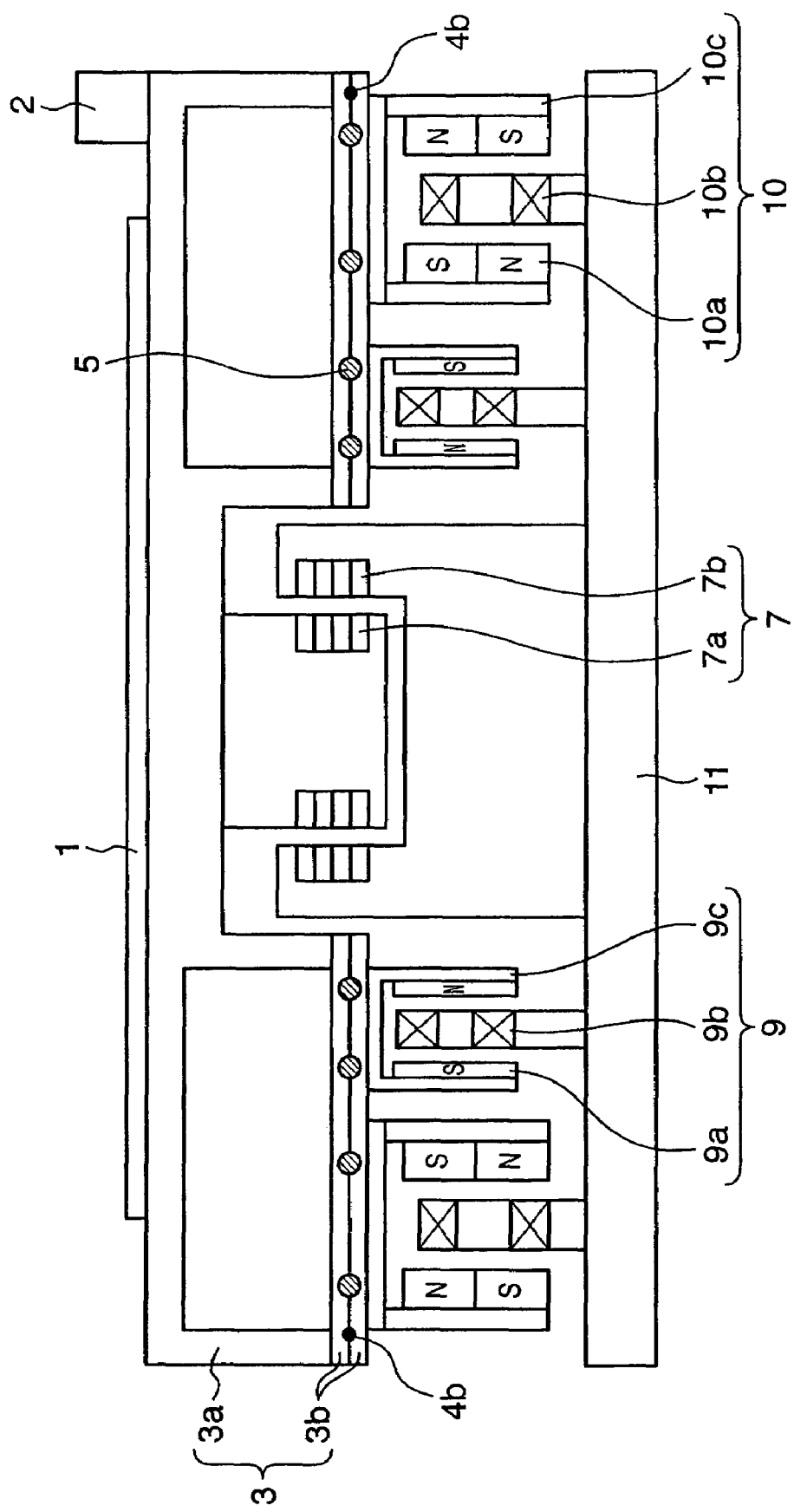
FIG. 1 is a schematic sectional view showing a fine-movement stage which forms an alignment apparatus according to the first embodiment of the present invention, and its peripheral portions.
Figure 2:
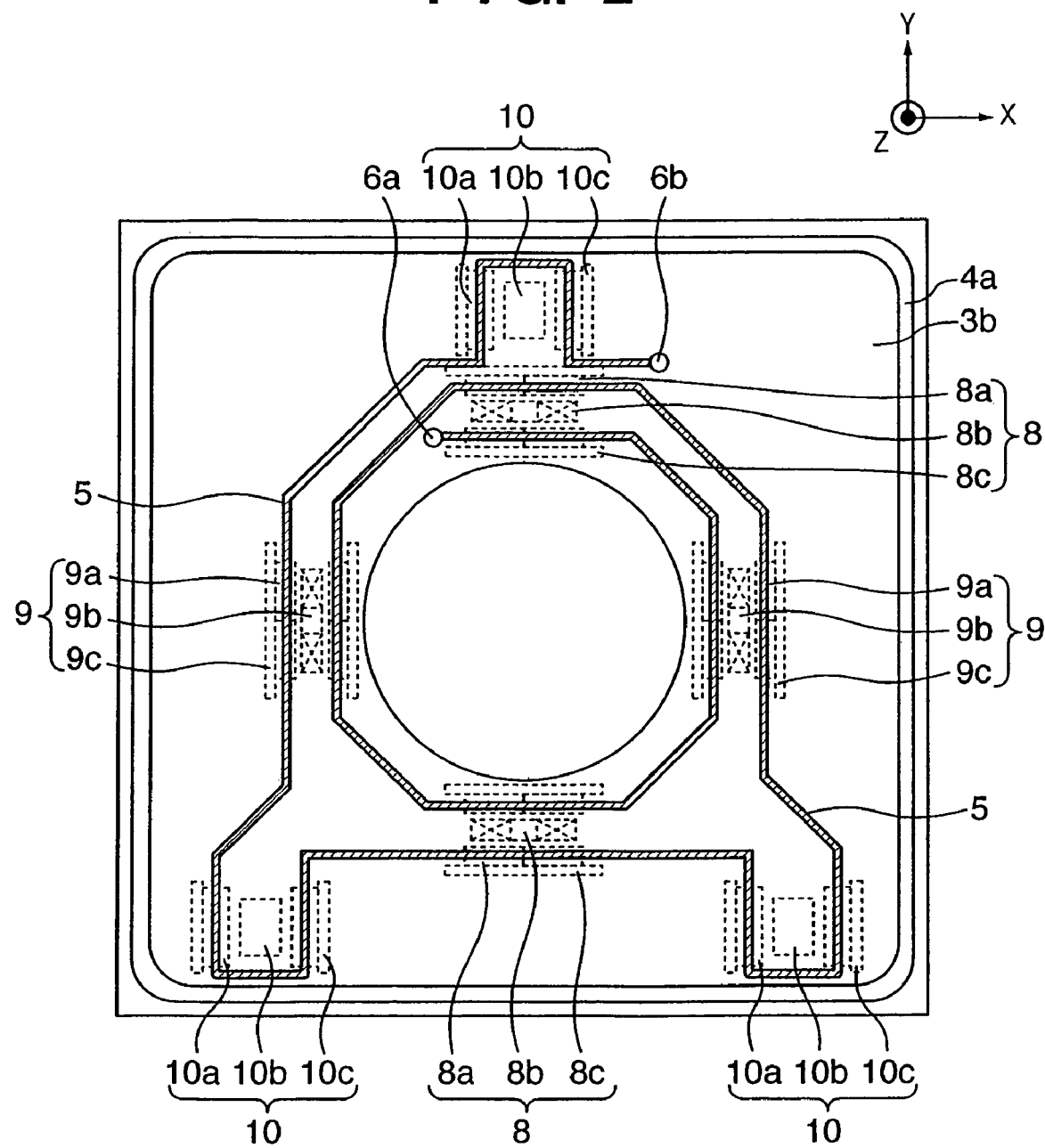
FIG. 2 is a perspective view seen from the top of the top panel (second structure) of FIG. 1.

FIG. 1 is a schematic sectional view showing a fine-movement stage which forms an alignment apparatus according to the first embodiment of the present invention, and its peripheral portions, and FIG. 2 is a perspective view seen from the top of a top panel which forms the fine-movement stage according to the first embodiment of the present invention, and its peripheral portions.

The fine-movement stage includes a chuck 1, bar-mirrors 2, a top panel (movable stage main body) 3, electromagnetic couplings 7, X-direction fine-movement linear motors 8 which have a self-weight compensating mechanism and transfer support rod (neither is shown) and serve to finely adjust the position of the top panel 3, Y-direction fine-movement linear motors 9, Z-direction fine-movement linear motors 10, and the like. These components are disposed on an X-Y slider 11 to form the fine-movement stage.

The top panel 3 comprises a first structure 3a (upper plate) formed of a hollow box-like plate member, and a second structure 3b (bottom plate) formed of a flat plate-like member and attached to the opening in the bottom surface of the first structure 3a. The first and second structures 3a and 3b may be fastened with screws or the like or integrally bonded with an adhesive or the like.

The wafer chuck 1 to hold a wafer (not shown), which is a photosensitive substrate serving as a moving target member, is fixed to the upper surface of the first structure 3a by vacuum air or a mechanical clamp mechanism (neither is shown). The wafer is also drawn and clamped by the chuck 1 with vacuum air or the electrostatic force (neither is shown). The bar-mirrors 2 to measure the relative position of the wafer are also set on the upper surface of the first structure 3a. The bar-mirrors 2, although only one that measures an X-direction position is shown in FIG. 1, are present in a plurality of directions (Y and Z directions) so as to measure positions in the 6 degrees of freedom described above. In the plan view of FIG. 2, the bar-mirrors 2 are not shown.

An actuator which uses the electromagnetic force to move the wafer to positions in the 6 degrees of freedom and a mechanism which supports the top panel 3 in the direction of gravity are provided to the lower surface of the second structure 3b. The actuator which uses the electromagnetic force includes two types. One is the electromagnetic couplings 7 which take charge of an acceleration in the X and Y directions. The other is a fine-movement linear motor serving as a Lorentz force actuator to control in the 6 degrees of freedom. The actuator has a short stroke and is placed on the X-Y slider 11 which can move with a long stroke.

The fine-movement linear motor includes the X-direction fine-movement linear motors 8, Y-direction fine-movement linear motors 9, and Z-direction fine-movement linear motors 10, which comprise movable element magnets 8a, 9a, and 10a, stator coils 8b, 9b, and 10b, and magnet attaching plates 8c, 9c, and 10c. As shown in FIGS. 1 and 2, the movable element magnets 8a, 9a, and 10a of the respective linear motors are attached to the magnet attaching plates 8c, 9c, and 10c and set in the second structure 3b of the top panel 3. The stator coils 8b, 9b, and 10b are arranged on the X-Y slider 11.

As shown in FIG. 1, the second structure 3b has an inner flow passage 5, through which a refrigerant is circulated, at a position close to the movable element magnets of the respective linear motors. The second structure 3b is formed by overlaying and bonding two flat plate-like first and second plate members. Each plate member has a groove which forms the inner flow passage 5 to circulate the refrigerant. An O-ring 4b is interposed at the bonding portion where the two plate members are adhered, thus sealing the two plate members.

The groove which forms the inner flow passage 5 may be formed in each or only one of the two plate members. As shown in FIG. 2, an O-ring groove 4a is formed to surround the inner flow passage 5. The O-ring 4b is arranged in the O-ring groove 4a, as shown in FIG. 1, to prevent the refrigerant circulating in the inner flow passage 5 from leaking outside the second structure 3b. As the seal means, other than the O-ring, adhesion using a gasket or adhesive may be employed.

As shown in FIG. 2, the inner flow passage 5 is preferably disposed to pass near the movable element magnets so as to recover heat (the refrigerant absorbs the heat by heat exchange) from the movable element magnets 8a, 9a, and 10a which is increased by the heat generation of the stator coils 8b, 9b, and 10b of the fine-movement linear motors 8, 9, and 10. Reference numerals 6a and 6b respectively denote an inlet and outlet to supply the refrigerant to the inner flow passage 5. One inlet 6a and one outlet 6b suffice, but pluralities of inlets 6a and outlets 6b also will do. The inner flow passage 5 is preferably formed such that the line resistance acting when the refrigerant circulates to the inlet 6a and outlet 6b is substantially equal in the respective lines. The groove desirably has such a shape that it recovers the heat efficiently, and is not limited to the shape exemplified in FIG. 2. The inner flow passage 5 may be formed by arranging a pipe in the second structure 3b or on the upper surface of the second structure 3b.

The inner flow passage 5 is aimed at recovering the heat of the movable element magnets 8a, 9a, and 10a which is increased by the heat generation of the stator coils 8b, 9b, and 10b so as to decrease the influence on the top panel 3. Hence, the inner flow passage 5 may alternatively be formed in the magnet attaching plates 8c, 9c, and 10c.

Thus, heat of the movable element magnets 8a, 9a, and 10a which is increased by the heat generation of the stator coils 8b, 9b, and 10b is recovered to decrease the influence on the top panel 3 and the environment, thus improving the alignment accuracy.

Second Embodiment

Figure 3A:
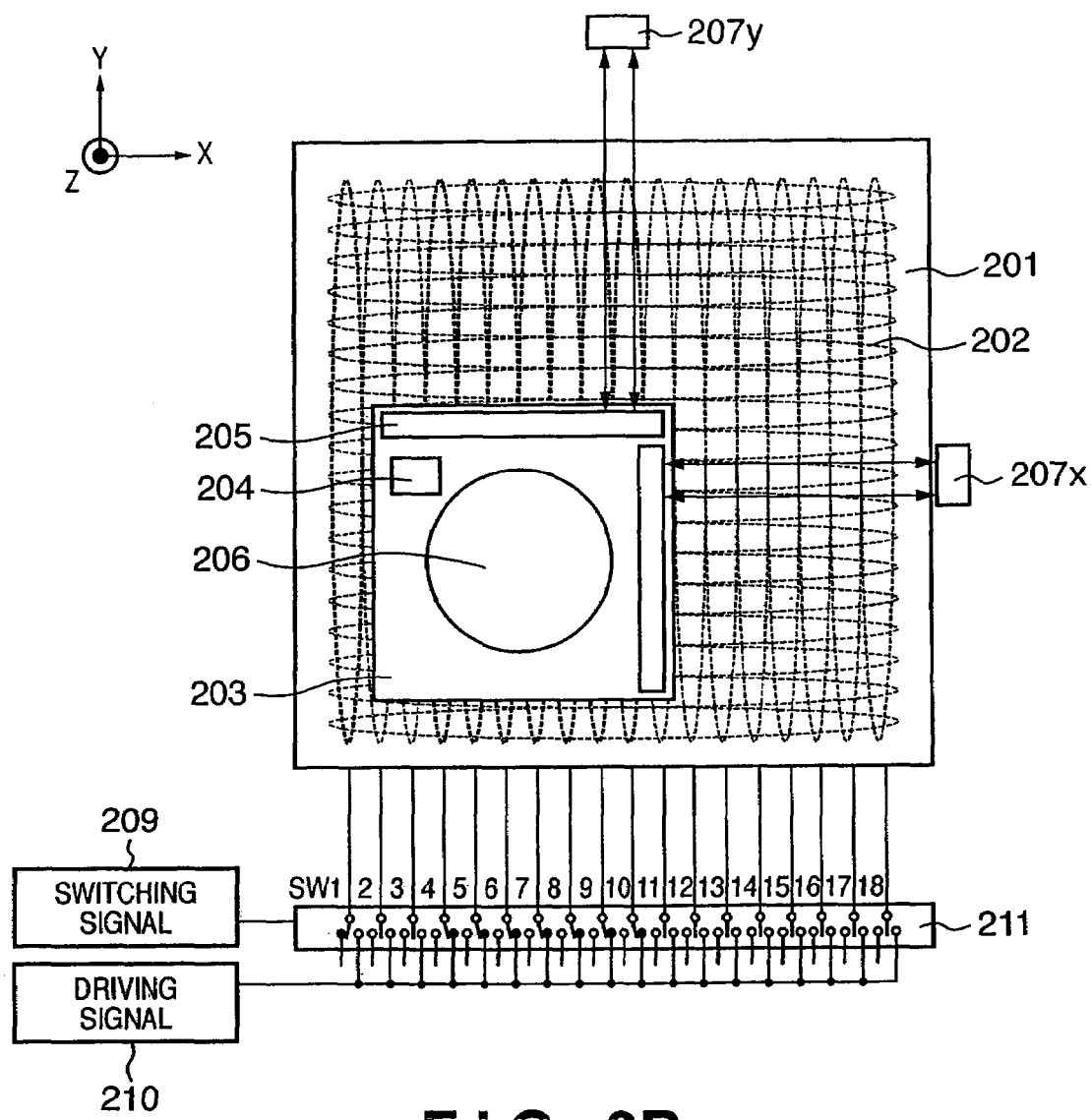
FIGS. 3A and 3B are plan and side views, respectively, showing the arrangement of a guideless 6-axis flat stage serving as an alignment apparatus according to the second embodiment of the present invention.
Figure 3B:
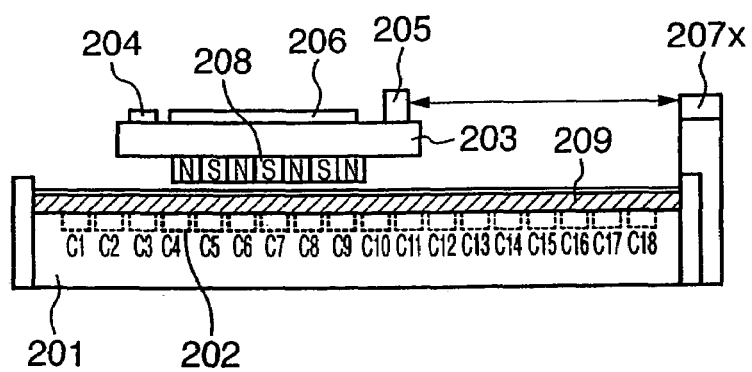

FIGS. 3A and 3B are plan and side views, respectively, showing the arrangement of a guideless 6-axis flat stage serving as an alignment apparatus according to the second embodiment of the present invention.

Referring to FIGS. 3A and 3B, reference numeral 201 denotes a base structure; 202, a driving coil group (stators); 203, a movable stage main body (movable element) serving as a flat stage; 204, a sensor; 205, bar-mirrors; 206, a chuck; 207x, an X-direction laser interferometer; 207y, a Y-direction laser interferometer; 208, permanent magnets; 209, a switching signal; 210, a driving signal; and 211, a selector switch, respectively.

In the flat stage shown in FIGS. 3A and 3B, the driving coil group 202 is arranged in a matrix in the base structure 201. Similarly, the permanent magnets 208 are arranged in a matrix on the lower portion of the movable stage main body 203. The plurality of permanent magnets 208 are magnetized in a predetermined direction and periodically arrayed flat on the movable stage main body 203. A plurality of coils are arrayed in the base structure 201 to oppose the permanent magnets 208 so as to correspond to the magnet array cycle. When a current is supplied to at least one coil of the driving coil group 202, the base structure 201 is driven as it obtains a thrust by the Lorentz force. Thus, thrusts in the 6 degrees of freedom can be obtained.

The chuck 206 and various types of sensors 204 are arranged on the movable stage main body 203. The chuck 206 holds the wafer with vacuum air or the electrostatic force (neither is shown). The sensors 204 include a sensor to monitor the light quantity of the light source, an alignment sensor, and the like.

The two bar-mirrors 205 are arranged on the movable stage main body 203 to be perpendicular to each other. The X-direction laser interferometer 207x and Y-direction laser interferometer 207y measure positions at least in the X, Y, and ωz directions. A current is supplied to at least one coil of the driving coil group 202 so as to coincide with a target value from a control system (not shown), thus performing alignment without a guide mechanism.

The driving coil group 202 is connected to the selector switch 211 to sequentially switch the driving coil group 202 in accordance with the position of the movable stage main body 203. Switches SWn (e.g., n=1 to 18) are arranged in the selector switch 211 to correspond to the respective coils, so as to connect the driving signal 210. The switches SWn are controlled by the switching signal 209 in accordance with the position of the stage.

The coils of the driving coil group 202 are numbered C1 to C18 sequentially from the left for the sake of the description to be made later. Similarly, the switches SWn are also numbered SW1 to SW18 sequentially from the left.

When the movable stage main body 203 and base structure 201 satisfy the positional relationship as shown in FIG. 3B, the coils C4 to C10 of the driving coil group 202 oppose the permanent magnets 208 on the lower surface of the movable stage main body 203. Thus, the switches SWn are turned on by the selector switch 211 so the driving signal 210 is supplied to them, and are used as the driving coils. The position of the movable stage main body 203 is measured by the laser interferometer 207. When the switching signal 209 is controlled in accordance with the position of the movable stage main body 203, a coil to be driven can be switched appropriately. The coils C2 and C3 do not oppose the permanent magnets 208 and thus cannot be used as the driving coils. Thus, the switches SW2 and SW3 are opened (turned off).

As described above, the guideless flat stage has the movable stage main body comprising movable element magnets and the stators comprising the driving coil group, and can move at least in the X and Y directions to perform alignment without any guide mechanism in the X and Y directions. Even in this guideless flat stage, it is significant to maintain the constituent members of the projection exposure apparatus and the ambient temperature constant from the same reason as that in the prior art.

Assume a guideless flat stage which has a movable stage main body (movable elements) comprising permanent magnets and stators comprising a driving coil group and which can move at least in the X and Y directions to perform alignment without any guide mechanism in the X and Y directions. When this stage is to be driven, heat generated by the driving coil group heats the magnets of the movable stage. The heat is transferred to the top panel through the magnets to heat the top panel, thus deforming the top panel. More specifically, the member to which a bar-mirror as the measurement target of a laser interferometer is attached is deformed by the temperature change. Then, the positions relative to each other of the mirror as the positional reference and a substrate change to degrade the measurement accuracy. Also, the temperature increase of the top panel changes the ambient temperature to influence the leaser interferometer. Thus, the laser beam fluctuates to degrade the measurement accuracy.

Furthermore, in the flat stage described as well, the heat of the magnets which is increased by the heat generation of the driving coil group must be recovered.

Figure 4:
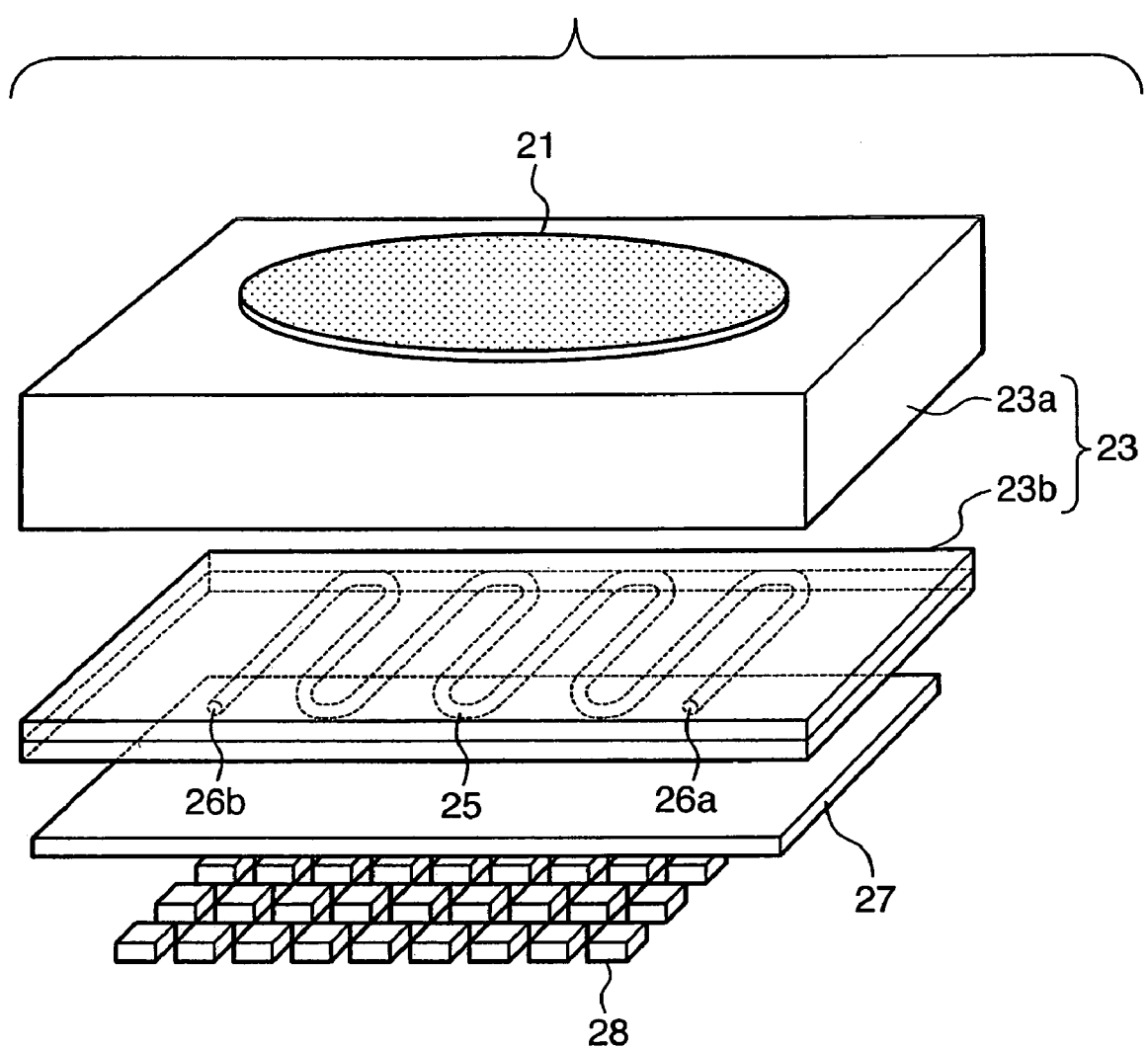
FIG. 4 is an exploded perspective view of a top panel which forms the alignment apparatus according to the second embodiment of the present invention.
Figure 6:
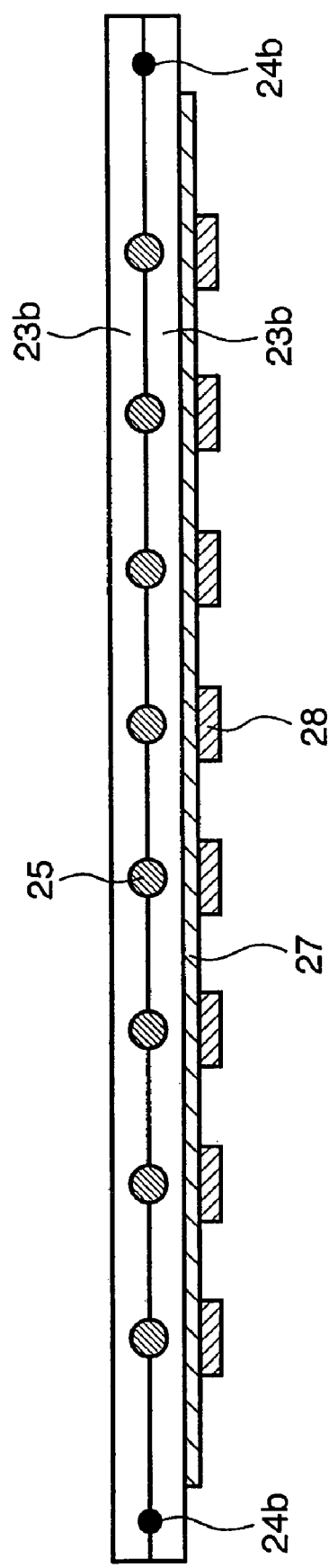
FIG. 6 is a sectional view taken along the line a-a of FIG. 5.

FIG. 4 is a perspective view of the second structure of a top panel which forms the alignment apparatus according to the second embodiment of the present invention, and its peripheral portions. The respective constituent members of the top panel are disassembled in the Z direction for the sake of easy understanding. FIG. 5 is a plan view of the second structure, and FIG. 6 is a sectional view taken along the line a-a of FIG. 5.

The alignment apparatus comprises a wafer chuck 21 and a top panel (movable stage main body) 23 which holds the chuck 21. The wafer chuck 21 to hold a wafer (not shown), which is a photosensitive substrate serving as a moving target member, is arranged on the upper surface of a first structure 23a of the top panel 23. The chuck 21 is fixed to the top panel 23 by vacuum air or a mechanical clamp (neither is shown). The wafer is also drawn and clamped by the chuck 1 with vacuum air or the electrostatic force (neither is shown).

The top panel 23 has the first structure 23a which has the wafer chuck 21 to attract and hold the wafer, and a second structure 23b to which permanent magnets 28 are attached through a magnet attaching plate 27. The first and second structures 23a and 23b may be fastened with screws or the like or integrally bonded with an adhesive or the like.

As shown in FIG. 4, an inner flow passage 25 to circulate the refrigerant is formed in the second structure 23b to extend near the respective magnet columns helically throughout the entire surface of the second structure 23b. As shown in FIG. 5, a groove which forms the inner flow passage 25, and an inlet 26a and outlet 26b to supply the refrigerant to the inner flow passage 25 are formed in the second structure 23b. One inlet 26a and one outlet 26b suffice, but pluralities of inlets 26a and outlets 26b also will do. The groove which forms the inner flow passage 25 is preferably formed such that the line resistance encountered when the refrigerant circulates to the inlet 26a and outlet 26b is substantially equal in the respective lines. The groove desirably has such a shape that it recovers the heat efficiently, and is not limited to the shape exemplified in FIG. 5.

As shown in FIG. 6, the second structure 23b is formed by overlaying and bonding two flat plate-like first and second plate members. Each plate member has a groove which forms the inner flow passage 25 to circulate the refrigerant. An O-ring 24b is interposed at the bonding portion where the two plate members are adhered, thus sealing the two plate members.

The groove which forms the inner flow passage 25 may be formed in each or only one of the two plate members. As shown in FIG. 5, an O-ring groove 24a is formed to surround the inner flow passage 5. The O-ring 24b is arranged in the O-ring groove 24a to prevent the refrigerant circulating in the inner flow passage 25 from leaking outside the second structure 23b. As the seal means, other than the O-ring, adhesion using a gasket or adhesive may be employed.

The inner flow passage 25 is aimed at recovering the heat of the permanent magnets 28 which is increased by the heat generation of the driving coil group 202 of FIGS. 3A and 3B so as to decrease the influence on the top panel 23. Hence, the flow passage 25 may alternatively be formed in the magnet attaching plate 27.

This embodiment can be applied to a guideless flat stage capable of long stroke driving as well as a fine-movement type flat stage mounted on a long stroke driving coarse-movement stage.

According to this arrangement, heat of the permanent magnets 28 which is increased by the heat generation of the driving coil group 202 is recovered to decrease the influence on the top panel 23 and the environment, thus improving the alignment accuracy.

Third Embodiment

Figure 7:
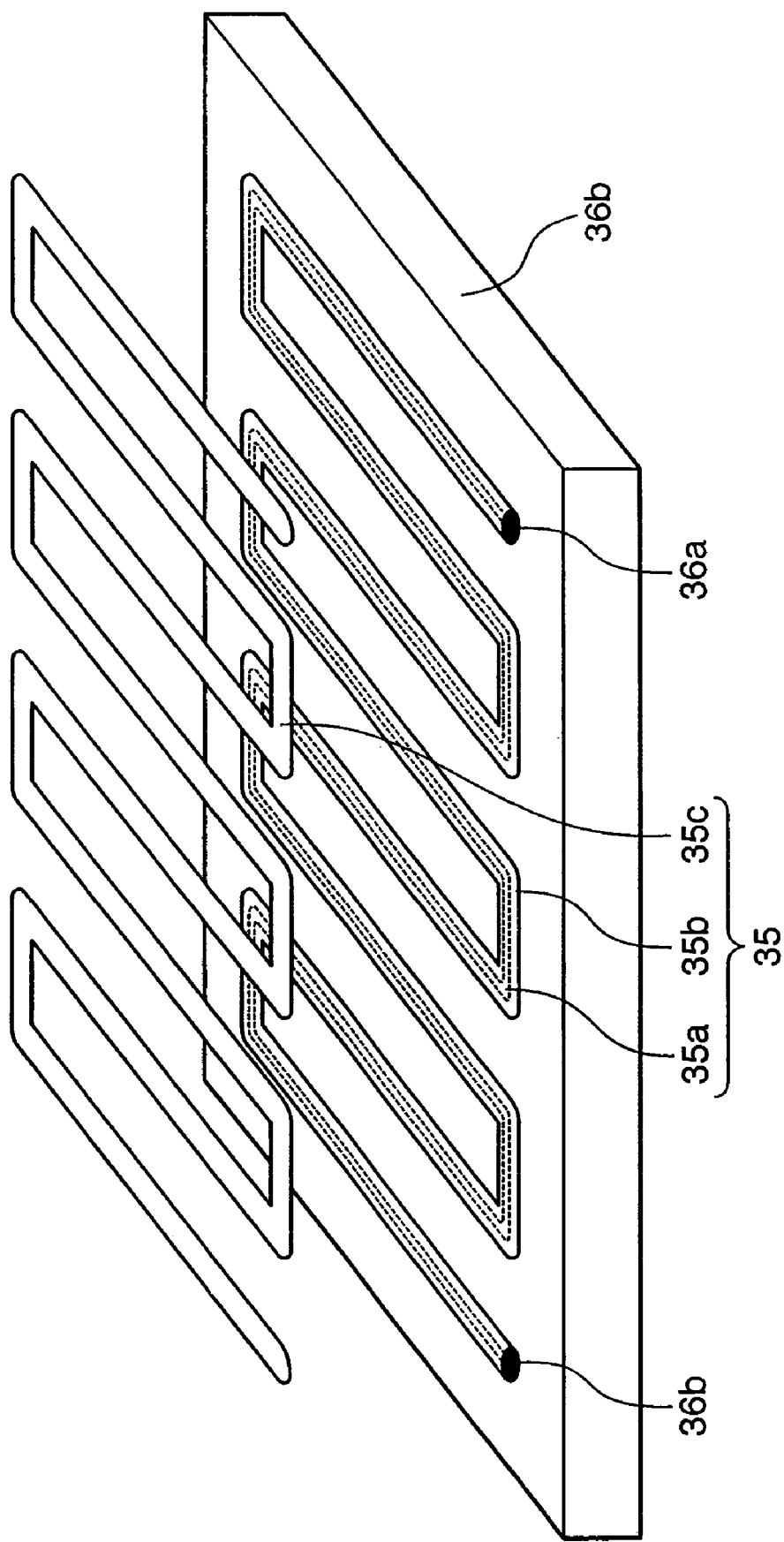
FIG. 7 is a perspective view of a top panel (second structure) which forms an alignment apparatus according to the third embodiment of the present invention.
Figure 8:
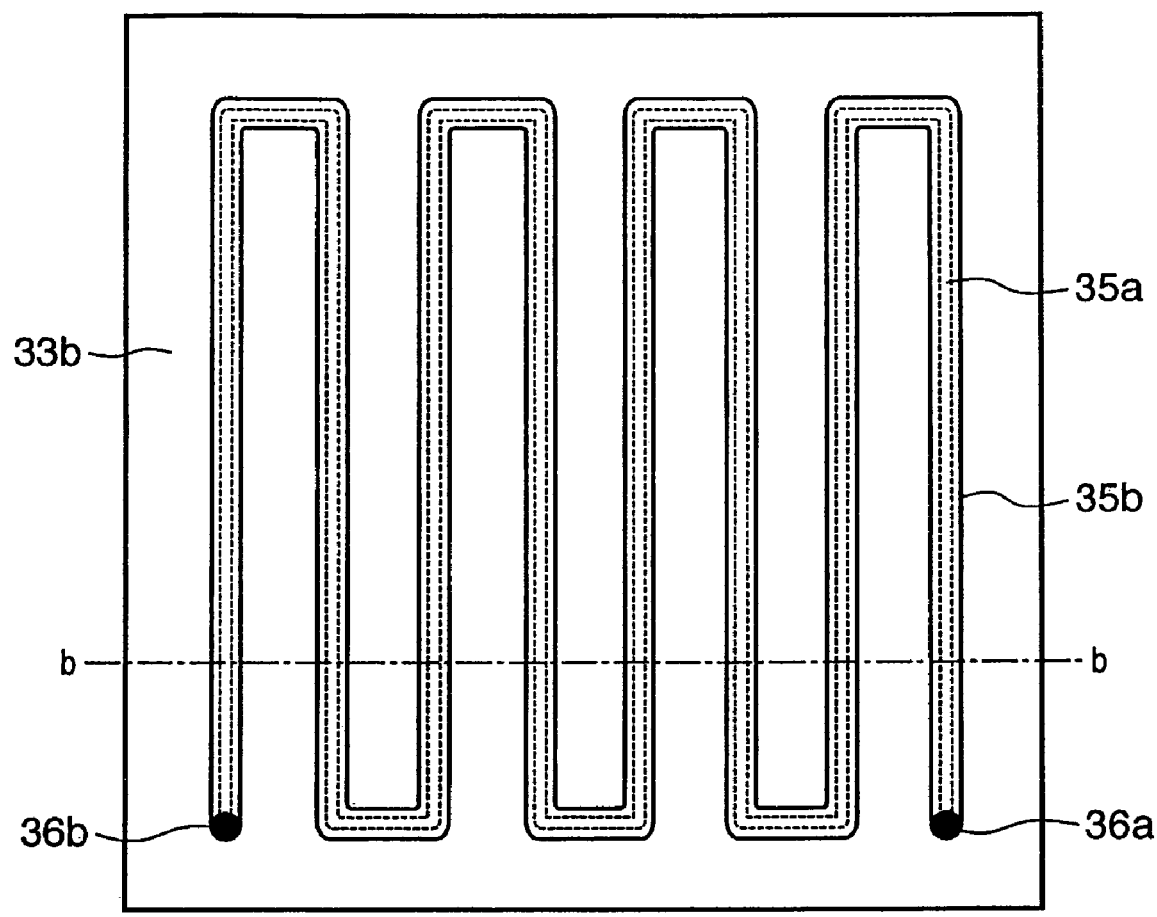
FIG. 8 is a plan view of FIG. 7.
Figure 9:
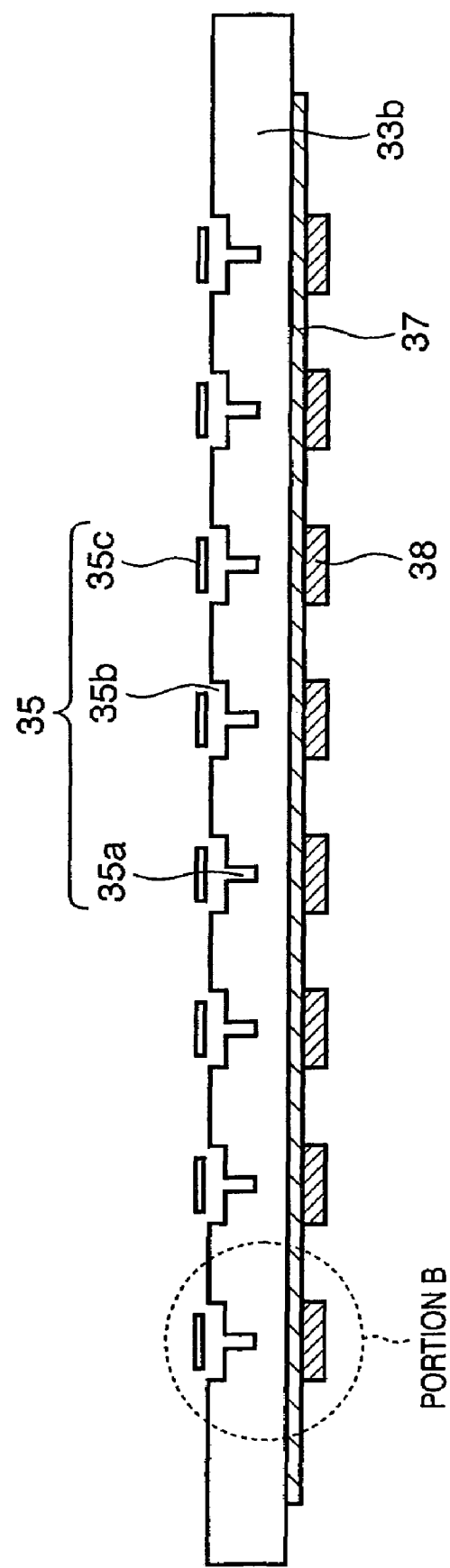
FIG. 9 is a sectional view taken along the line b-b of FIG. 8.
Figure 10:
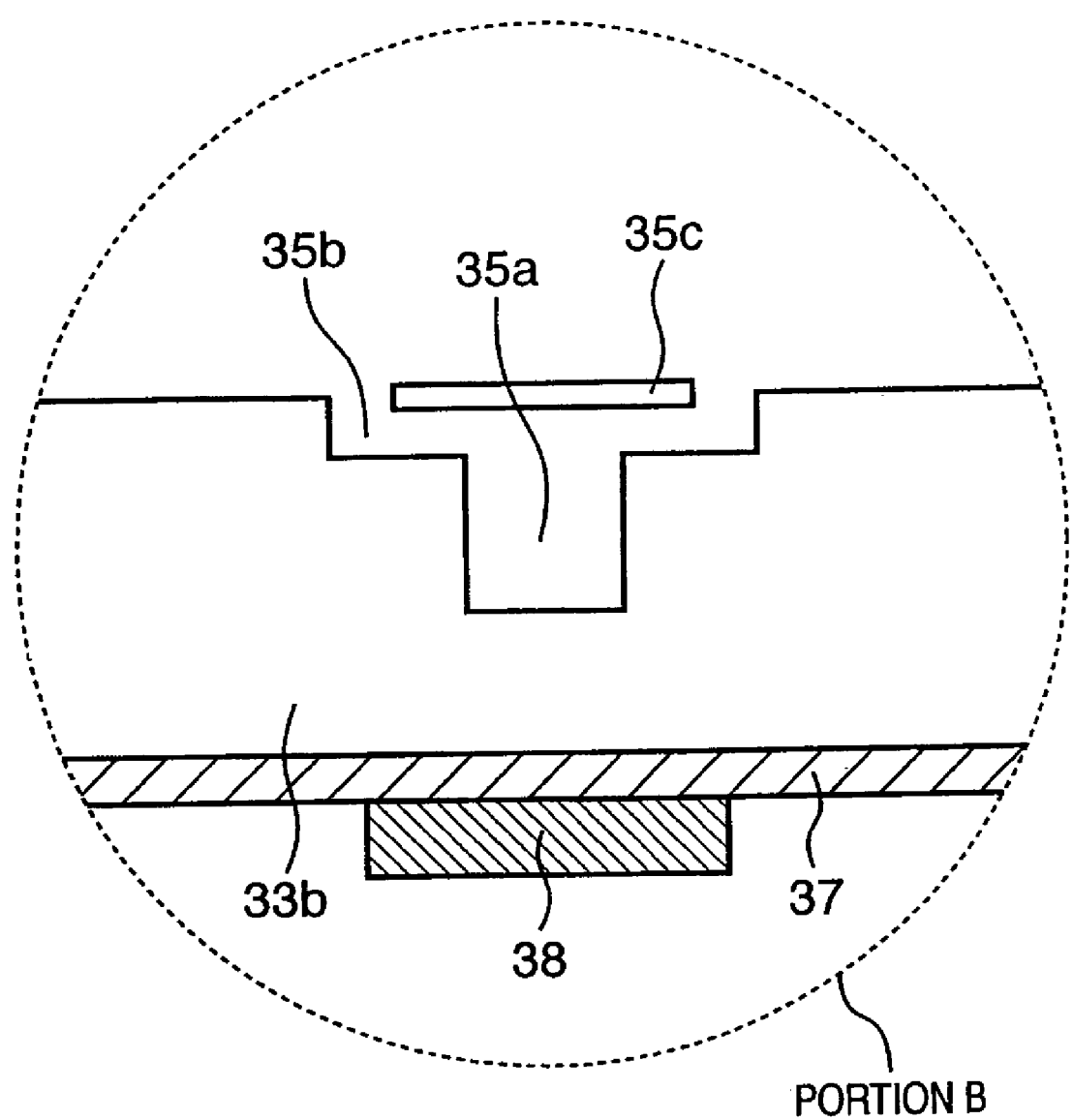
FIG. 10 is an enlarged view of a portion B of FIG. 9.

FIG. 7 is a perspective view showing the second structure of a top plate which forms an alignment apparatus according to the third embodiment of the present invention, and its peripheral portions, FIG. 8 is a plan view of the second structure, FIG. 9 is a sectional view taken along the line b-b of FIG. 8, and FIG. 10 is an enlarged view of a portion B of FIG. 9. The arrangement of other peripheral portions is the same as that in the second embodiment, and a detailed description thereof will be omitted.

As shown in FIG. 7, grooves 35a and 35b which form a helically extending inner flow passage 35, and an inlet 36a and outlet 36b to supply a refrigerant to the inner flow passage 35 are formed in a second structure 33b which forms the bottom plate of the top panel. One inlet 36a and one outlet 36b suffice, but pluralities of inlets 36a and outlets 36b also will do. The grooves which form the inner flow passage 35 are preferably formed such that the line resistance acting when the refrigerant circulates to the inlet 36a and outlet 36b is substantially equal in the respective lines. The grooves desirably have such shapes that they recover the heat efficiently, and are not limited to the shapes exemplified in FIG. 8.

As shown in FIGS. 7 and 8, the grooves 35a and 35b which define the inner flow passage 35 described above, and a lid member 35c with a shape to close the openings of the grooves are provided to the second structure 33b. As shown in FIGS. 9 and 10, the flow passage 35 is formed by bonding the lid member 35c to the grooves 35a and 35b formed in the second structure 33b and interposing a seal means (not shown) at the bonding portion where the lid member 35c is bonded, to prevent the refrigerant from leaking outside. As the seal means, an O-ring or adhesion using a gasket or adhesive may be employed.

The inner flow passage 35 is aimed at recovering the heat of magnets 38 which is increased by the heat generation of a driving coil group (not shown) so as to decrease the influence on the top panel, in the same manner as in the second embodiment. Hence, the flow passage 35 may alternatively be formed in the magnet attaching plate 37.

This embodiment can be applied to a guideless flat stage capable of long stroke driving as well as a fine-movement type flat stage mounted on a long stroke driving coarse-movement stage, in the same manner as in the second embodiment.

According to this arrangement, heat of the magnets 38 which is increased by the heat generation of the driving coil group (not shown) is recovered to decrease the influence on the top panel and the environment, thus improving the alignment accuracy.

Fourth Embodiment

Figure 11:
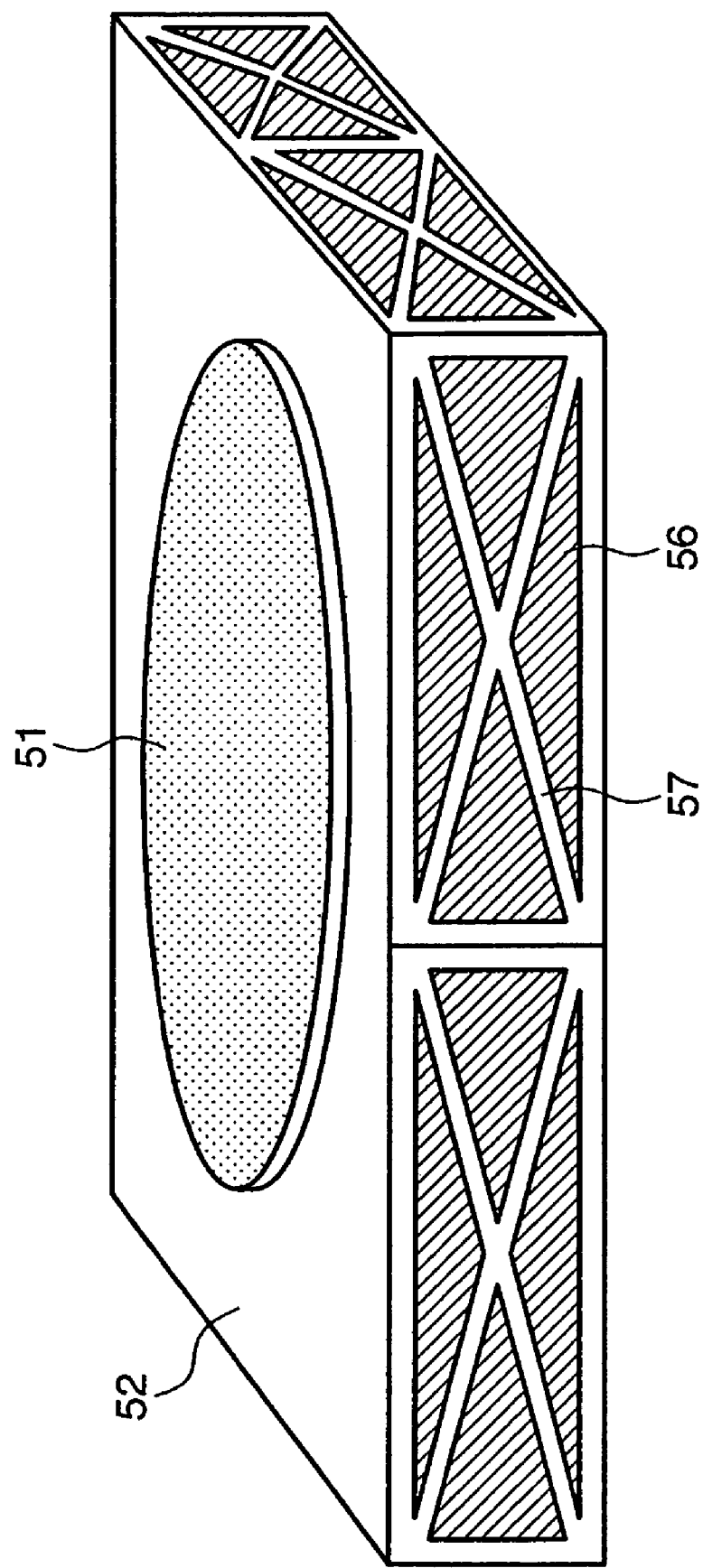
FIG. 11 is a perspective view of a top panel (first structure) which forms an alignment apparatus according to the fourth embodiment of the present invention.
Figure 12:
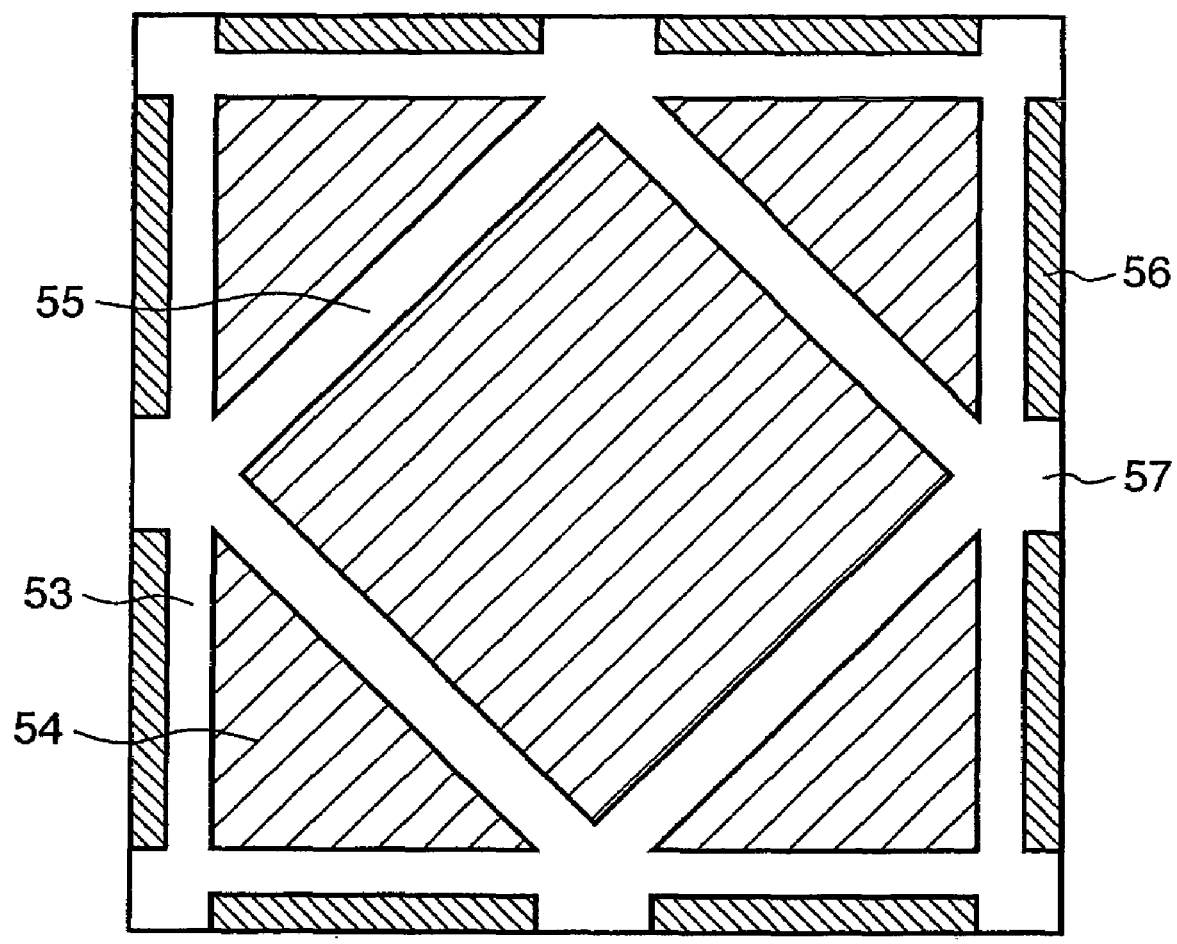
FIG. 12 is a bottom view of FIG. 11.

FIG. 11 is a perspective view showing the second structure of a top panel which forms an alignment apparatus according to the fourth embodiment of the present invention, and FIG. 12 is a bottom view of the top panel.

The alignment apparatus according to this embodiment includes a hollow box-like top panel (first structure) 52 which serves as a movable stage main body. A wafer chuck 51 is held on the upper surface of the hollow top panel 52 to hold a wafer (not shown) which is a photosensitive substrate serving as a moving target member. The chuck 51 is fixed to the hollow top panel 52 by vacuum air or a mechanical clamp (neither is shown). The wafer is also drawn and clamped by the chuck 51 with vacuum air or the electrostatic force (neither is shown).

Referring to FIGS. 11 and 12, the hollow top panel 52 has a bored portion 54, as shown in FIG. 11, from which an excessive thick portion is removed. A rib 55 having a symmetrical square structure as shown in FIG. 12 is further formed in the hollow top panel 52 to ensure rigidity. In order to decrease the weight of side plates 53 which define the respective outer side surfaces of the thick-walled hollow top panel 52 and extend downward from the respective peripheral portions, the hollow top panel 52 has side plate bored portions 56 from which excessive thick portions are removed to form recesses in directions of normal to the corresponding side plates 53. Also, to further ensure the rigidity, ribs 57 which intersect diagonally are formed in the respective side plates 53.

As described, when the side plates 53 form a rib structure, the rigidity can be ensured. Thus, unlike in the conventional case, the thickness of each side plate need not be entirely decreased, and the hollow top panel 52 does not become heavy more than necessary. Hence, the hollow top panel 52 can be made lightweight. The load to the motor that drives the flat stage can be decreased. A current necessary to generate a force that can stand this driving can also be decreased simultaneously. Heat from the driving coil group as stators is decreased greatly to decrease the influence on the environment, thus improving the alignment accuracy.

The rib structure of the side plates is not limited to the shape shown in FIG. 11.

[Application to Exposure Apparatus]

Figure 13:
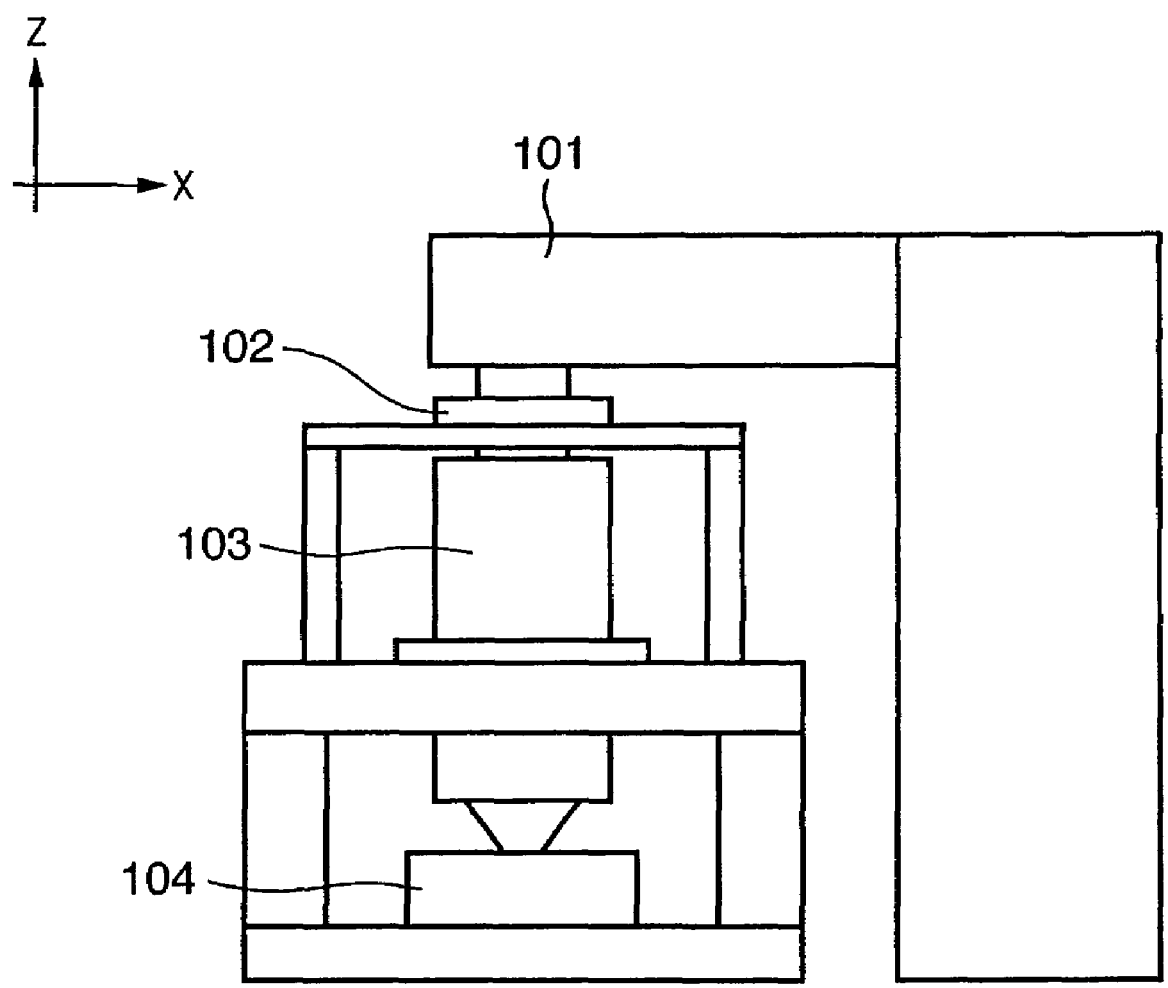
FIG. 13 is a view showing an application to an exposure apparatus.
Figure 14:
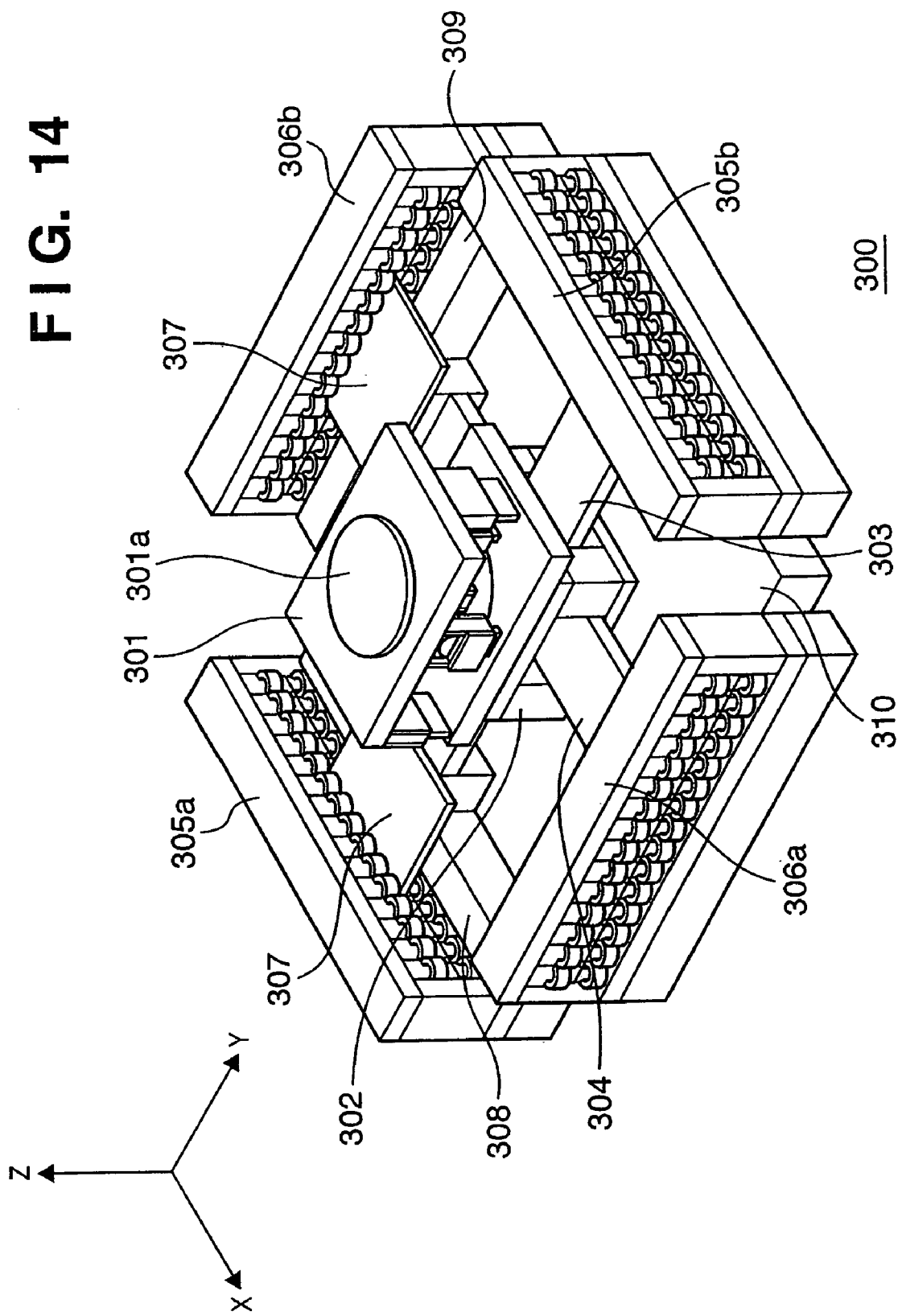
FIG. 14 is a perspective view of a general wafer stage mounted in a semiconductor exposure apparatus.

FIG. 13 is a view exemplifying a semiconductor device manufacturing exposure apparatus to which the alignment apparatus according to one of the above embodiments is applied as a wafer stage.

As shown in FIG. 13, the exposure apparatus according to this embodiment comprises an illumination device 101 which radiates exposure light, a reticle stage 102 which holds and moves a reticle, a projection optical system 103, and a wafer stage 104 which holds and moves a wafer. The exposure apparatus projects and exposes a circuit pattern formed on the reticle onto the wafer. As the projection exposure scheme, step & repeat or step & scan can be employed.

The illumination device 101 illuminates the reticle formed with the circuit pattern, and has a light source portion and illumination optical system. For example, the light source portion uses a laser as the light source. As the laser, an ArF excimer laser with a wavelength of about 193 nm, a KrF excimer laser with a wavelength of about 248 nm, an $F_2$ excimer laser with a wavelength of about 153 nm, or the like can be used. The type of the laser is not limited to excimer laser. For example, a YAG laser may be used. The number of lasers is not limited. When a laser is used as the light source, a beam shaping optical system which shapes a parallel beam from the laser light source to have a desired beam shape, and an incoherent optical system which changes a coherent laser beam into an incoherent laser beam are preferably used. The light source that can be used in the light source portion is not limited to lasers, but one or a plurality of lamps such as mercury lamps or xenon lamps can be used. The illumination optical system is an optical system that illuminates the reticle and includes a lens, mirror, light integrator, stop, and the like.

As the projection optical system 103, an optical system comprising only a plurality of lens elements, an optical system (catadioptric optical system) having a plurality of lens elements and at least one concave mirror, an optical system having a plurality of lens elements and at least one diffraction optical element such as a kinoform, a full-mirror-type optical system, or the like can be used.

Such an exposure apparatus can be used in the manufacture of a semiconductor device such as a semiconductor integrated circuit and a device such as a micromachine or thin film magnetic head on which a fine pattern is formed.

According to the above arrangement, an exposure apparatus in which at least either one of the pattern overlaying precision and apparatus operating efficiency (throughput) is improved can be realized.

[Device Manufacturing Method]

An embodiment of a device manufacturing method which uses the exposure apparatus described above will be described.

Figure 15:
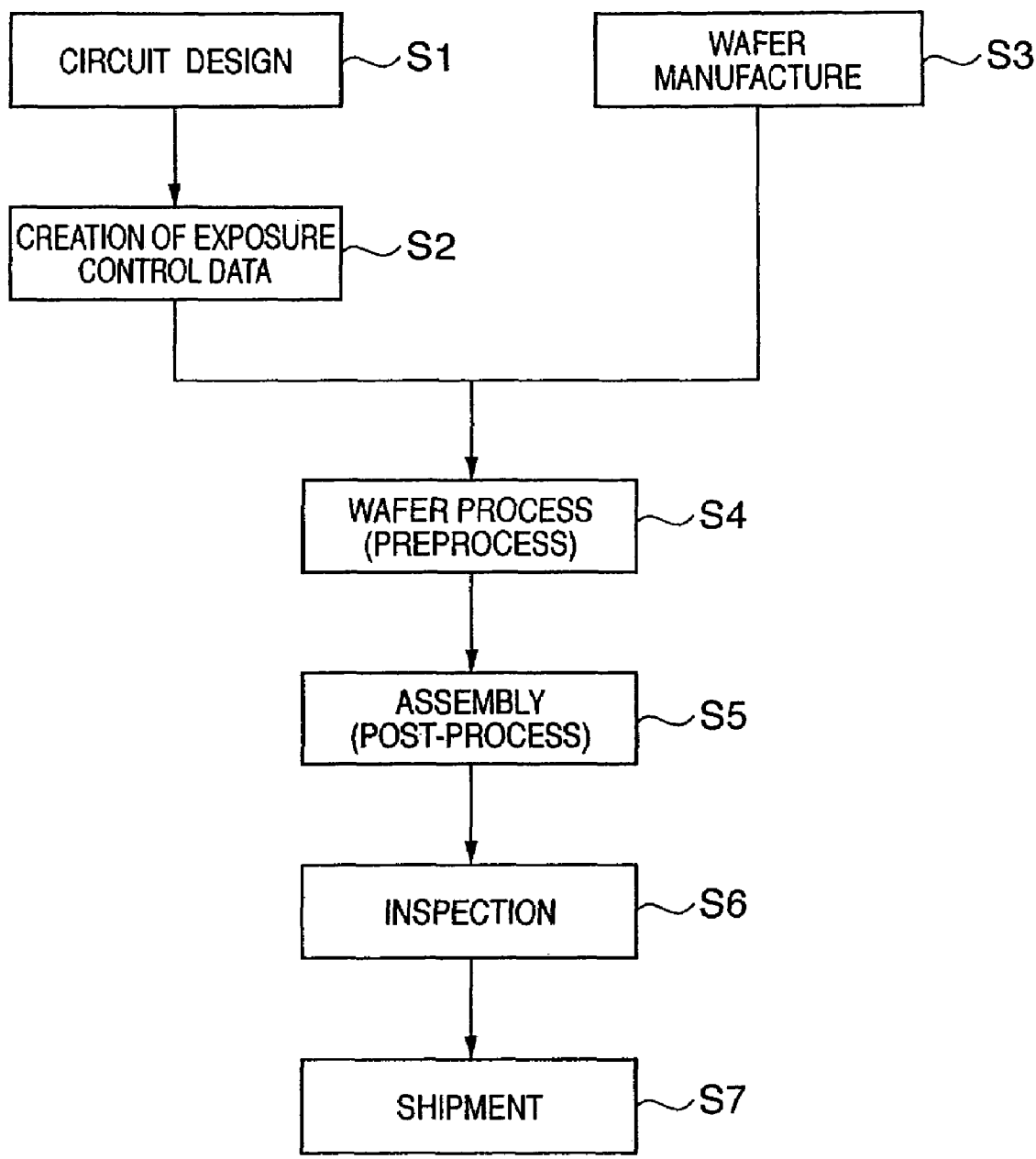
FIG. 15 is a flowchart for explaining the flow of the manufacture of a microdevice.

FIG. 15 is a flowchart showing the flow of the manufacture of a microdevice (a semiconductor chip such as an IC or LSI, a liquid crystal panel, a CCD, a thin film magnetic head, a micromachine, or the like). In step S1 (circuit design), the circuit of a semiconductor device is designed. In step S2 (creation of exposure control data), exposure control data for the exposure apparatus is created on the basis of the designed circuit pattern. In step S3 (wafer manufacture), a wafer is manufactured using a material such as silicon. In step S4 (wafer process) called a preprocess, an actual circuit is formed on the wafer in accordance with lithography using the wafer and the exposure apparatus to which the prepared exposure control data has been input. In the next step S5 (assembly) called a post-process, a semiconductor chip is formed from the wafer fabricated in step S4. This step includes processes such as an assembly process (dicing and bonding) and a packaging process (chip encapsulation). In step S6 (inspection), inspections such as operation check test and durability test of the semiconductor device fabricated in step S5 are performed. A semiconductor device is finished with these steps and shipped (step S7).

Figure 16:
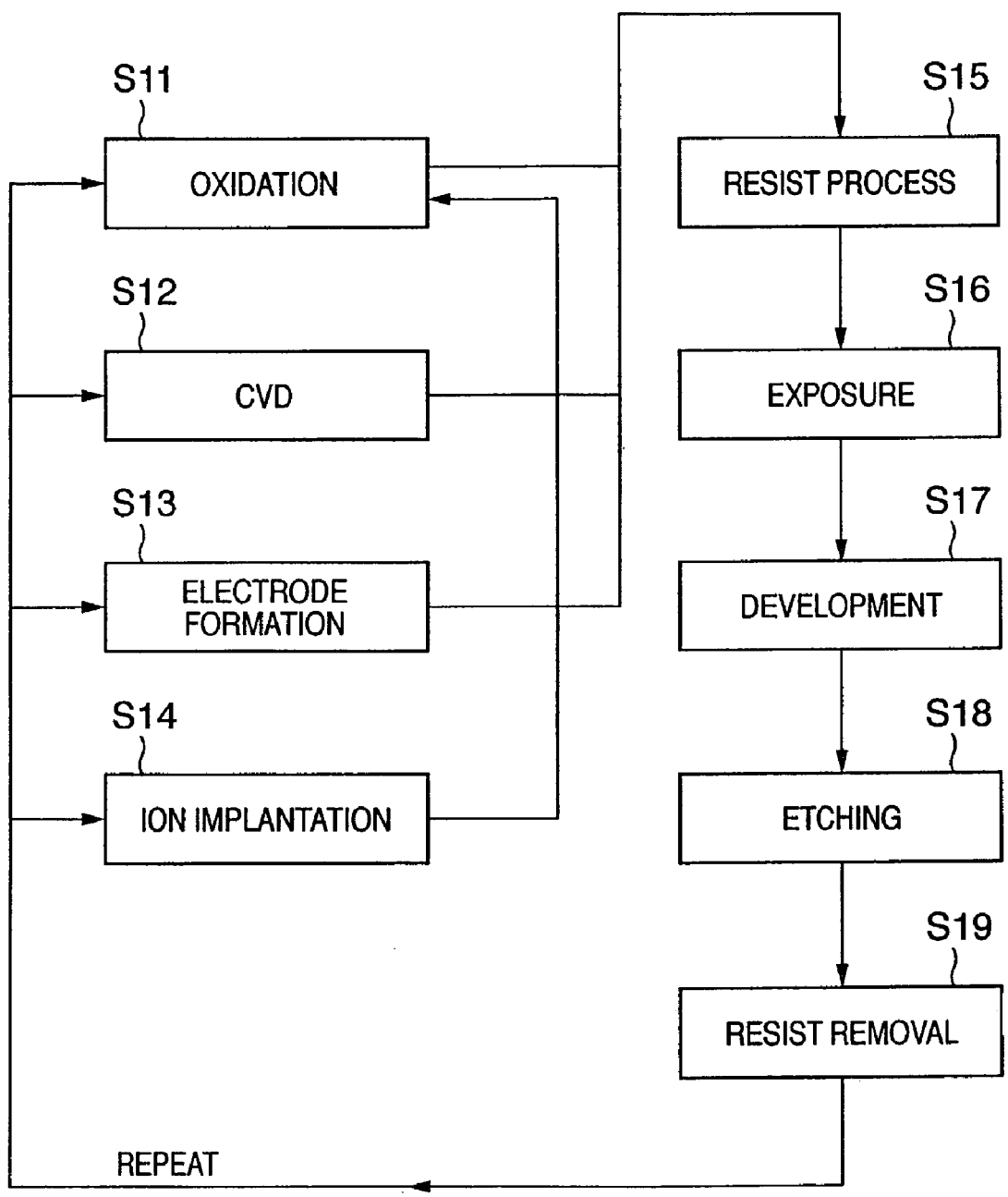
FIG. 16 is a flowchart for explaining a wafer process.

FIG. 16 is a flowchart showing the flow of the above wafer process in detail. In step S11 (oxidation), the surface of the wafer is oxidized. In step S12 (CVD), an insulating film is formed on the wafer surface. In step S13 (electrode formation), an electrode is formed on the wafer by deposition. In step S14 (ion implantation), ions are implanted in the wafer. In step S15 (resist process), a photosensitive agent is applied to the wafer. In step S16 (exposure), the circuit pattern is printed and exposed on the wafer by the exposure apparatus described above. In step S17 (development), the exposed wafer is developed. In step S18 (etching), portions other than the developed resist image are removed. In step S19 (resist removal), any unnecessary resist after etching is removed. These steps are repeated to form multiple circuit patterns on the wafer.

When the manufacturing method according to this embodiment is used, a large-integrated semiconductor device which is conventionally difficult to manufacture can be manufactured at a low cost.

The present invention can be applied to, in addition to a semiconductor exposure apparatus which is used in the manufacture of a semiconductor element and liquid crystal display element, various types of precision machining apparatuses and various types of precision measurement apparatuses, and can perform high-speed alignment of a machining target object and measurement target object at high accuracy.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-020019, filed Jan. 27, 2005, which is hereby incorporated by reference herein in its entirety.

What is claimed is:

1. An alignment apparatus which moves an object comprising:
   a holding member which holds the object;
   a plate-like member which mounts said holding member; and
   a linear motor which has a coil and a magnet and drives said plate-like member;
   wherein said plate-like member has
   (i) a first structure which is a hollow member having an opening and in which said holding member is mounted; and
   (ii) a second structure attached to the opening of said first structure and in which a magnet is mounted, wherein a flow passage of a coolant is formed in said second structure and arranged between said holding member and said magnet.

2. The apparatus according to claim 1, wherein
   said second structure is constituted by overlaying a first plate-like member and a second plate-like member, and
   said flow passage comprises a pipe formed between said first plate-like member and said second plate-like member.

3. The apparatus according to claim 2, wherein said pipe comprises a groove portion formed between said first plate-like member and said second plate-like member.

4. The apparatus according to claim 3, wherein said groove portion is formed in at least either one of said first plate-like member and said second plate-like member.

5. The apparatus according to claim 3, wherein said first plate-like member comprises said groove portion and said second plate-like member comprises a lid member which closes said groove portion.

6. The apparatus according to claim 1, wherein said first plate-like member and said second plate-like member are bonded through a seal member.

7. The apparatus according to claim 1, wherein
   said magnet is attached to said second structure through a third plate-like member, and
   said flow passage is formed in said third plate-like member.

8. The apparatus according to claim 1, wherein
   a recess is formed in side surface of said first structure.

9. The apparatus according to claim 1, wherein
   said magnet comprises a plurality of magnetized magnets arrayed two-dimensionally, and said flow passage is arranged along a plane substantially parallel to a plane by which said plurality of magnets form.

10. An exposure apparatus comprising an alignment apparatus according to claim 1,
    wherein said alignment apparatus moves at least one of a master and substrate to expose a pattern on the master onto the substrate.

11. A method of manufacturing a device, said method comprising the steps of:
    exposing a substrate to a pattern using an exposure apparatus as defined in claim 10;
    developing the exposed substrate.

* * * * *